US011373093B2

(12) United States Patent
Gu et al.

(10) Patent No.: US 11,373,093 B2
(45) Date of Patent: Jun. 28, 2022

(54) DETECTING AND PURIFYING ADVERSARIAL INPUTS IN DEEP LEARNING COMPUTING SYSTEMS

(71) Applicant: International Business Machines Corporation, Armonk, NY (US)

(72) Inventors: Zhongshu Gu, Ridgewood, NJ (US); Hani T. Jamjoom, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 16/452,709

(22) Filed: Jun. 26, 2019

(65) Prior Publication Data
US 2020/0410335 A1  Dec. 31, 2020

(51) Int. Cl.
*G06N 3/08* (2006.01)
*G06K 9/62* (2022.01)
*G06N 3/04* (2006.01)

(52) U.S. Cl.
CPC ............ *G06N 3/08* (2013.01); *G06K 9/6256* (2013.01); *G06K 9/6262* (2013.01); *G06N 3/04* (2013.01)

(58) Field of Classification Search
CPC .......... G06N 3/08; G06N 3/04; G06N 3/0454; G06K 9/6256; G06K 9/6262; G06V 10/82; G06V 40/40
See application file for complete search history.

(56) References Cited

U.S. PATENT DOCUMENTS

| 10,628,943 | B2 | 4/2020 | Hsieh et al. |
| 2015/0193693 | A1 | 7/2015 | Vasseur et al. |
| 2016/0142659 | A1* | 5/2016 | Shin .............. H04N 5/367 348/246 |
| 2017/0017857 | A1 | 1/2017 | Wolf et al. |
| 2018/0025272 | A1 | 1/2018 | Lin et al. |
| 2018/0144466 | A1 | 5/2018 | Hsieh et al. |
| 2018/0278647 | A1 | 9/2018 | Gabaev et al. |
| 2019/0138719 | A1 | 5/2019 | Sultana et al. |
| 2019/0188830 | A1 | 6/2019 | Edwards et al. |

(Continued)

OTHER PUBLICATIONS

List of IBM Patents or Patent Applications Treated as Related, Apr. 21, 2021, 2 pages.

(Continued)

*Primary Examiner* — Marcos L Torres
(74) *Attorney, Agent, or Firm* — Stephen J. Walder, Jr.; Jeffrey S. LaBaw

(57) ABSTRACT

Adversarial input detection and purification (AIDAP) preprocessor and deep learning computer model mechanisms are provided. The deep learning computer model receives input data and processes it to generate a first pass output that is output to the AIDAP preprocessor. The AIDAP preprocessor determines a discriminative region of the input data based on the first pass output and transforms a subset of elements in the discriminative region to modify a characteristic of the elements and generate a transformed input data. The deep learning computer model processes the transformed input data to generate a second pass output that is output to the AIDAP preprocessor which detects an adversarial input or not based on a comparison of the first pass and second pass outputs. If an adversarial input is detected, a responsive action that mitigates effects of the adversarial input is performed.

20 Claims, 5 Drawing Sheets

(56) References Cited

U.S. PATENT DOCUMENTS

| | | |
|---|---|---|
| 2019/0318099 A1 | 10/2019 | Carvalho et al. |
| 2020/0337648 A1 | 10/2020 | Saripalli et al. |
| 2020/0410335 A1 | 12/2020 | Gu et al. |
| 2021/0056404 A1 | 2/2021 | Goswami et al. |
| 2021/0067549 A1* | 3/2021 | Chen .................. H04L 63/20 |
| 2021/0142450 A1* | 5/2021 | Fan .................. G06V 30/142 |

OTHER PUBLICATIONS

Athalye, Anish et al., "Obfuscated Gradients Give a False Sense of Security: Circumventing Defenses to Adversarial Examples", Proceedings of the 35th International Conference on Machine Learning, PMLR 80, 2018, arXiv:1802.00420 v4 [cs.LG], Jul. 31, 2018, 12 pages.

Biggio, Battista et al., "Evasion attacks against machine learning at test time", In Joint European Conference on Machine Learning and Knowledge Discovery in Databases, 2013, arXIV: 1708.06131v1 [cs.CR] Aug. 21, 2017, 16 pages.

Binder, Alexander et al., "Layer-wise Relevance Propagation for Neural Networks with Local Renormalization Layers", arXiv:1604.00825 v1 [cs.CV], Apr. 4, 2016, 8 pages.

Carlini, Nicholas et al., "Towards Evaluating the Robustness of Neural Networks", 2017 IEEE Symposium on Security and Privacy (SP), arXIV: 1608.04644v2 [cs.CR] Mar. 22, 2017, 19 pages.

Goodfellow, Ian J. et al., "Explaining and Harnessing Adversarial Examples", Published as a conference paper at ICLR 2015, arXIV: 1412.6572v3 [stat.ML] Mar. 20, 2015, 11 pages.

Guo, Chuan et al., "Countering Adversarial Images Using Input Transformations", arXIV: 1711.00117v3 [cs.CV] Jan. 25, 2018, 12 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

Nguyen, Anh et al., "Deep Neural Networks are Easily Fooled: High Confidence Predictions for Unrecognizable Images", In Computer Vision and Pattern Recognition (SVPR'15), IEEE, Jun. 7-12, 2015, arXIV: 1412.1897v4 [cs.CV] Apr. 2, 2015, 20 pages.

Selvaraju, Ramprasaath R. et al., "Grad-CAM: Visual Explanations from Deep Networks via Gradient-Based Localization", ICCV, 2017, arXIV: 1610.02391v3 [cs.CV] Mar. 21, 2017, 24 pages.

Szegedy, Christian et al., "Intriguing properties of neural networks", ICLR, 2013, arXIV: 1312.6199v4 [cs.CV] Feb. 19, 2014, 10 pages.

Xu, Weilin et al., "Feature Squeezing: Detecting Adversarial Examples in Deep Neural Networks", In Network and Distributed Systems Security Symposium (NDSS) Feb. 2018, arXIV: 1704.01155v2 [cs.CV] Dec. 5, 2017, 15 pages.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, 14 pages.

Zhou, Bolei et al., "Learning Deep Features for Discriminative Localization", Proceedings of the IEEE Conference on Computer Vision and Pattern Recognition, pp. 2921-2929, Jun. 26-Jul. 1, 2016.

List of IBM Patents or Patent Applications Treated as Related, Aug. 20, 2019, 2 pages.

Carlini, Nicholas et al., "Adversarial Examples Are Not Easily Detected: Bypassing Ten Detection Methods", Proceedings of the 10th ACM Workshop on Artificial Intelligence and Security (AISec'17), Nov. 3, 2017, submitted copy from arXIV: 1705.07263v2 [cs.LG], Nov. 1, 2017, 12 pages.

Chun, Young Deok et al., "Content-Based Image Retrieval Using Multiresolution Color and Texture Features", IEEE Transactions on Multimedia, vol. 10, No. 6, Oct. 2008, pp. 1073-1084.

Feinman, Reuben et al., "Detecting adversarial samples from artifacts", arXiv:1703.00410, Nov. 2017, 9 pages.

Mei, Shike et al., "The Security of Latent Dirichlet Allocation", 18th International Conference on Artificial Intelligence and Statistics (AISTATS), May 9-12, 2015, pp. 681-689.

Metzen, Jan H. et al., "On detecting adversarial perturbations", Published as a conference paper at ICLR, arXiv:1702.04267, Feb. 2017, 12 pages.

Tistarelli, Massimo et al., "On the Use of Discriminative Cohort Score Normalization for Unconstrained Face Recognition", IEEE Transactions on Information Forensics and Security, vol. 9, Issue: 12, Oct. 8, 2014, pp. 1-13.

Zhang, Yimeng et al., "Image Retrieval with Geometry-Preserving Visual Phrases", The 24th IEEE Conference on Computer Vision and Pattern Recognition, CVPR 2011, Jun. 20-25, 2011, pp. 809-816.

* cited by examiner

US 11,373,093 B2

DETECTING AND PURIFYING ADVERSARIAL INPUTS IN DEEP LEARNING COMPUTING SYSTEMS

BACKGROUND

The present application relates generally to an improved data processing apparatus and method and more specifically to mechanisms for detecting and purifying adversarial inputs in deep learning computing systems.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets. Labeled data may also be provided for supervised deep learning.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions which are executed by the at least one processor to specifically configure the at least one processor to implement an adversarial input detection and purification (AIDAP) preprocessor and a deep learning computer model. The method comprises receiving, by the deep learning computer model, input data for processing by the deep learning computer model, and processing, by the deep learning computer model, the input data to generate a first pass output that is output to the AIDAP preprocessor. The method further comprises determining, by the AIDAP preprocessor, a discriminative region of the input data based on the first pass output, where the discriminative region is a portion of the input data that is determined to have a significant influence on the operation of the deep learning computer model in generating the first pass output. In addition, the method comprises transforming, by the AIDAP preprocessor, a subset of elements in the discriminative region of the input data to modify a characteristic of the elements in the subset of elements and generate a transformed input data, and processing, by the deep learning computer model, the transformed input data to generate a second pass output that is output to the AIDAP preprocessor. Furthermore, the method comprises detecting, by the AIDAP preprocessor, that the input data comprises an adversarial input or is a non-adversarial input based on a comparison of the first pass output with the second pass output, and in response to the AIDAP preprocessor detecting the input data comprises an adversarial input, performing a responsive action that mitigates effects of the adversarial input.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
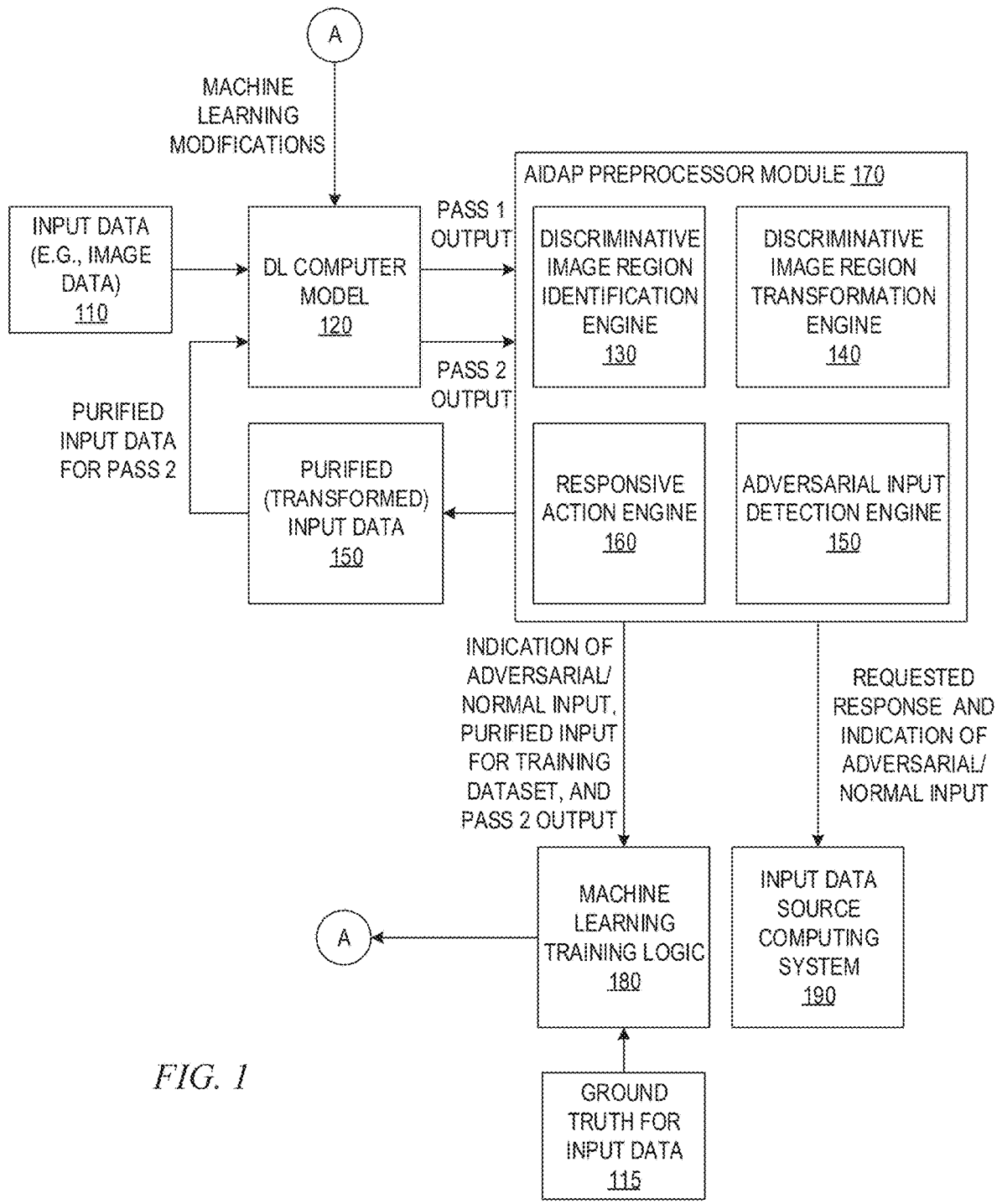
FIG. 1 is an example block diagram illustrating an example operation of the primary components of an adversarial input detection and purification (AIDAP) system in accordance with one illustrative embodiment.

Various cognitive systems may utilize trained models, such as trained neural networks, to perform their cognitive operations. For example, a neural network implemented model may be used to provide image analysis, facial recognition, fingerprint or retinal image recognition, speech pattern analysis, or the like, for a cognitive security system, such as an image recognition surveillance system, a biometric authentication system, etc. Often times, such neural networks, and other types of machine learning or cognitive models, are utilized in or with cognitive systems to perform a classification operation, upon which the cognitive system operates to perform a cognitive operation, e.g., classifying an input into one of a plurality of predetermined classifications (classes) which is then used to perform a more complex analysis or reasoning operation using cognitive system mechanisms.

Attackers may attempt to thwart such systems by performing evasion attacks, such as gradient-based attacks. An evasion attack on a cognitive system, e.g., on the neural network or other cognitive or machine learning model implemented by the cognitive system, involves the attacker attempting to fool the model to misclassify a manipulated input. For example, an attacker may make almost imperceptible manipulations on input data to generate adversarial input, where an adversarial input is an input formed by applying small, but intentional, perturbations to data samples from a data set (where the term "data set" as used herein refers to a set of one or more data samples), such that the perturbed input results in the computing model, e.g., deep learning neural network (DNNs), convolutional neural networks (CNNs), or other machine learning computing model, outputting an incorrect answer with high confidence. The adversarial input will cause the computing model (hereafter assumed to be a convolutional neural network (CNN), as an example) to misclassify the input and thus, malfunction, resulting in a breach of security. The misclassification that the adversarial input intends to cause is often referred to as the "target" label (t) generated by the computing model based on the input data, whereas the correct or "true" label ($t_0$) is the label that the computing model should output for the original (non-perturbed) input data. Such misclassification may prevent the computing model, and thus the system, from correctly classifying valid inputs as valid, or allow invalid inputs to be incorrectly classified as valid. For example, an attacker attempting to fool a facial recognition neural network may first obtain access to the trained neural network and based on an analysis of the trained neural network, generate adversarial inputs by purposefully adding small imperfections to their appearance, and thereby generate an adversarial input, in an attempt to fool the facial recognition into misclassifying the attacker as an authorized individual.

Such evasion attacks, e.g., Fast Gradient Step Method (FGSM) or Iterative Fast Gradient Step Method (IFGSM) and the like, tend to be classifiable as white box attacks and are dependent upon the attacker identifying a correct gradient of the loss surface of the neural network or other cognitive or machine learning model. The loss surface, also referred to as the loss function or cost function, in the context of machine learning, neural networks, and cognitive system operations, is a function that represents the price paid for inaccuracy of predictions, e.g., the cost of inaccuracy in a classification prediction. A white box attack involves the attacker having full access to the cognitive system and the attacker may in fact be a user of the cognitive system, as opposed to black box attacks where the attacker does not have access to the endpoints of a secure transaction, or a gray box attack in which the attacker is able to interact with one or more of the endpoints via observation and/or alteration of system parts and processes. Such white box attacks are mostly based on gradients, as described in Goodfellow et al., "Explaining and Harnessing Adversarial Examples," ICLR 2015, Mar. 20, 2015. For example, the JSMA attack is a type of white box attack that greedily modifies one pixel at a time until the image is classified incorrectly. The FGSM attack takes a single step, for all pixels, in the direction of the gradient. The Carlini and Wagner (C&W) attack uses gradient descent to optimize a custom loss function. Other types of attacks include the elastic-net attack on DNNs (EAD), structured (Str) attacks, and the like.

In order to harden computer models, such as those implemented in cognitive systems, neural networks, or other machine learning models, against such attacks, adversarial inputs may be generated during training of these systems, networks or models, to train these systems, networks, or models to be less sensitive to the adversarial perturbations implemented by these attacks. However, these approaches have been demonstrated to be fragile to adaptive adversarial attacks, such as described in Athalye et al., "Obfuscated Gradients Give a False Sense of Security: Circumventing Defenses to Adversarial Examples," arXiv preprint arXiv: 1802.00420 (2018).

The illustrative embodiments address these deficiencies in hardening mechanisms by detecting and purifying adversarial inputs for online deep learning inference systems at real time. The mechanisms of the illustrative embodiments may be deployed seamlessly as a pre-processing mechanism operating with any deep learning computer models, e.g., convolutional neural networks (CNNs), to eliminate the most influential adversarial factors at the pixel level and draw adversarial examples back to their correct classifications or categories.

It should be appreciated that the illustrative embodiments operate with regard to adversarial inputs, also referred to as adversarial examples, which are inputs received from an attacker, who may have had access to the trained neural network, cognitive system, or other machine learning model and determined any weaknesses associated with the trained neural network, cognitive system or machine learning model such that the attacker can devise adversarial perturbations that may be made to valid inputs to cause the model to generate incorrect results. That is, due to the fact that a model cannot be trained for every possible input the model may see during runtime, i.e. the model is trained with a finite training dataset, the model may have weaknesses in its ability to properly classify particular types of inputs, and an attacker may recognize these limitations and exploit them during runtime operation by providing adversarial inputs. This is opposed to other types of attacks, such as model poisoning attacks or trojan attacks, where attackers introduce poisoned samples into a training dataset and train the model to generate incorrect results for similarly poisoned samples at runtime, also referred to as prediction time. Thus, references herein to "adversarial inputs" or "adversarial examples" are referring to inputs received by the neural network, cognitive system, or other machine learning model, at runtime or prediction time, and which have one or more adversarial perturbations introduced by an attacker.

The illustrative embodiments have been devised based on the observation that small crafted perturbations in the high-dimensional inputs may effectively influence the final prediction results of the deep learning computing models, e.g., the classifications or categories output by the models. Although adversarial inputs (or "examples") can be classified into attack-specific classes with high confidence, such adversarial inputs are also fragile to data augmentation techniques, such as smoothing, rotation, blurring, etc., such as described in Xu et al., "Feature Squeezing: Detecting Adversarial Examples in Deep Neural Networks," arXiv preprint arXiv:1704.01155 (2017) and Guo et al., "Countering Adversarial Images Using Input Transformations," arXiv preprint arXiv:1711.00117 (2017). In contrast, normal inputs, i.e. non-adversarial inputs, are resilient to such augmentation transformations.

Based on the observation of such fragility and resiliency, the mechanisms of the illustrative embodiments provide an improved computer tool that is specifically designed and configured to exploit the unreliability property of adversarial inputs and to detect and purify adversarial inputs submitted to deep learning computing models and computing systems. The mechanisms of the illustrative embodiments, during a first pass of an input through the deep learning computer model or computing system, perform an analysis on the input data and the output generated by the deep learning (DL) computer model or computing system to detect a subset of an input's pixels that contribute significantly to the DL computer model or system's final output, e.g., has a large (e.g., greatest amount, higher than a predetermined threshold amount, or another suitable statistical measure) amount of weight, relative to other data elements, in the calculation of a value corresponding to the final classification prediction or category prediction. In some illustrative embodiments where the input data represents an image, for example, a classification activation map (CAM) mechanism is utilized to identify and detect adversarial perturbations in input data. The use of CAM to identify discriminative image regions used by a computer model to identify the category of the input image has been described in Zhou et al. "Learning Deep Features for Discriminative Localization," Proceedings of the IEEE Conference on Computer Vision and Pattern Recognition, pp. 2921-2929, 2016. Discriminative image regions are the regions of an input image that are highly influential in the final determination of the output generated by the computer model, e.g., the deep learning neural network (DNN), convolutional neural network (CNN), or the like.

In some illustrative embodiments, the CAM mechanism may be a gradient-weighted classification activation map (Grad-CAM) methodology as described in Selvaraju et al., "Grad-CAM: Visual Explanations from Deep Networks via Gradient-Based Localization," ICCV 2017, which is employed to detect the subset of input pixels that contribute the most to the DL computer model or system's final output. It should be appreciated that other mechanisms may also be utilized to identify the subset of input data elements, e.g., pixels, that are most influential on an output generated by the DL computer model or system, without departing from the spirit and scope of the present invention. For example, a layer-wise relevance propagation (LRP) mechanism, such as described in Binder et al., "Layer-wise Relevance Propagation for Neural Networks with Local Renormalization Layers", arXiv preprint arXiv:1604.00825 (2016), may also be used to identify the influential regions corresponding to a specific class decision.

A purification operation is then performed on the subset of pixels so as to eliminate any adversarial influence of these pixels on the final output of the DL computer model or computer system. For example, in some illustrative embodiments one or more semantics-preserving transformations may be performed, e.g., average on adjacent pixels, random pixel dropout, or the like, on this subset of the input's pixels. Such targeted pixel level manipulations effectively eliminate the influence of adversarial perturbations added by attackers should the input be an adversarial input. At the same time, these manipulations are guaranteed to not affect the final output generated by the DL computer model or system when the input is a normal, i.e. non-adversarial, input.

After this purification operation is performed on the input data, the operation of the DL computer model or system on the purified input is performed again as a second pass through the DL computer model or system. If the final output generated by the DL computer model or system, e.g., the predicted classification or category output, generated during this second pass does not change from that generated during the first pass, then the input is determined to be a normal, i.e. non-adversarial, input. If the final output generated by the DL computer model or system generating during the second pass does change from that generated during the first pass, then the input is determined to be adversarial. This differs from known mechanisms which attempt to mitigate adversarial attacks by transforming the deep learning computer models themselves rather than, as in the present invention, detecting and purifying the input to these deep learning computer models. Moreover, contrary to other known mechanisms, the mechanisms of the illustrative embodiments perform targeted transformations of the input data by first detecting the portions of the input data that are most influential on the operation and final output of the DL computer model or system and then performing transformations only on this targeted, and relatively small subset, of input elements, e.g., pixels, in order to purify the input data.

Having identified whether or not the input is an adversarial input or a normal input, various responsive actions may be performed if the input is determined to be adversarial. For example, if a client's input data is received for processing by a DL computer model executing on a computing system, the input data may first be pre-processed using the pre-processing mechanisms of the illustrative embodiments to determine whether the input data contains any adversarial inputs. These adversarial inputs may then be automatically purified dynamically such that the final output generated by the DL computer model is based on the purified input data and not the adversarial input data. Notifications may be automatically generated and sent back to the client along with the results of the operation of the DL computer model on the purified input data, indicating that adversarial input data was detected and purified and that the results generated by the DL computer model are based on the purified input data. In this way, the client is given the results as requested, but is also informed of the fact that their input data may have been compromised so that they can take appropriate action to thwart further attempts by the attacker. The notification may include details of the adversarial input so that the source of the adversarial inputs may be further investigated or other responsive actions taken to reduce the likelihood that the attacker can successfully attack the DL computer model or system. For example, if the source of the input data is known from the received input data set, then the source information may be reported back to the authorized user along with information about the detected adversarial input, e.g., the input data compromised, the influential subset of input elements where the adversarial perturbations were detected, and the like. This information may be sent in the notifications via an electronic communication, in a data file, or otherwise logged for later review and evaluation.

Thus, the illustrative embodiments provide mechanisms for hardening DL computer models and computer systems from adversarial attacks during runtime, or prediction time, operation by providing a pre-processor that operates on the input data to detect adversarial inputs and purify those inputs prior to returning runtime or prediction results, e.g., a classification of the inputs. In this way, during runtime operation, the DL computer models and computer systems, while only being trained with normal inputs, are able to be protected from adversarial inputs through the identification and purification process of the pre-processor of the illustrative embodiments. That is, during runtime operation, incorrect outputs or results generated from the DL computer models and computer systems based on adversarial inputs intentionally attempting to cause misclassification are minimized.

The illustrative embodiments provide such mechanisms for hardening or protecting DL computer models and computer systems without having to modify the DL computer models, e.g., the DNNs, CNNs, or the like, themselves. As a result, the mechanisms of the illustrative embodiments are applicable to various types of DL computer models and computer systems, whether they are already trained or are trained via the mechanisms of the illustrative embodiments.

It should be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims makes use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," as used herein with regard to describing embodiments and features of the invention, is not intended to be limiting of any particular implementation for accomplishing and/or performing the actions, steps, processes, etc., attributable to and/or performed by the engine. An engine may be software, hardware and/or firmware or any combination thereof that performs the specified functions including, but not limited to, any use of a general and/or specialized processor in combination with appropriate software loaded or stored in a machine readable memory and executed by the processor to thereby specifically configure the processor to perform the specified functions. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the present description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example block diagram illustrating the primary operational elements of an improved computer tool, referred to as an adversarial input detection and purification (AIDAP) preprocessor module (or simply AIDAP for conciseness), in accordance with one illustrative embodiment. The elements shown in FIG. 1 may be implemented in specifically configured hardware configured to perform the associated operations of the elements, software executed on hardware where the software is specifically configured to perform the associated operations of the elements when executed by the hardware, or any combination of such specially configured hardware and executed software. It should be appreciated that, in the case of software executed on hardware, various computer code can be generated to achieve the operations set forth herein in view of the present description, and the illustrative embodiments are not limited to any one specific computer code implementation. Moreover, it should be appreciated that other hardware/software elements may be provided to facilitate basic computer functions, such as control, messaging, data transfer, and the like, both within and with external computing devices.

As shown in FIG. 1, the AIDAP preprocessor module 170 operates in conjunction with a deep learning (DL) computer model 120 to harden the DL computer model 120 against adversarial perturbation based attacks. This hardening is accomplished not by modifying the DL computer model 120, but rather by detecting adversarial inputs and dynamically purifying the input upon which the DL computer model 120 operates during runtime. It should be appreciated that the DL computer model 120 is a computer model that executes on one or more computing devices in order to perform a cognitive evaluation of input data and generate an output, which may be a decision output, a classification output, or the like. The term "cognitive" as it is used herein refers to the approximation, by a computing device, of human thought processes by emulating these thought processes in computer logic executed by a computer. It should be appreciated that even though the computing device attempts to approximate or emulate the human thought processes, the way that computers operate is significantly different than the human mind due to the nature of computers requiring explicit instructions in order to perform operations. For example, while a human mind may see a picture of a cat and be able to intuitively know that the picture is one of a cat, a computing device performing image recognition operations, using a cognitive computing system, must have logic and be trained to recognize certain characteristics of the image data as representative of a cat and properly classify it as such. Thus, while human thought processes may be emulated, the computer operation is a completely different operation from that of a human mind, even though the result may appear to be similar. Ingenuity is required to make a computing device emulate human thought processes due to this fundamental difference in the way a human mind and a computer operate.

The DL computer model 120, in some illustrative embodiments, is a neural network based computer model, e.g., a deep learning neural network (DNN), a convolutional neural network (CNN), or the like. The DL computer model 120 is trained through a machine learning training operation whereby, through either supervised or unsupervised machine learning, the operational parameters of the computer model are adjusted based on a detected error in the output of the computer model until the error (or loss) is minimized to a predetermined level, e.g., equal to or less than a predetermined threshold level of error/loss. For example, in an embodiment in which the DL computer model 120 is a CNN, operational parameters of the nodes of the CNN may be modified through an iterative machine learning training operation by training logic that modifies these operational parameter, e.g., weights associated with nodes, so as to minimize the error/loss in the output generated by the CNN.

The computer model 120 may be trained to perform various types of cognitive operations, such as decision support operations, recommendation generation, classification, etc. For purposes of the following description, it will be assumed that the DL computer model 120 is a CNN that is trained or is being trained to perform an image classification operation on input data that represents one or more images. It should be appreciated that this is only one example of an application of the DL computer model 120 with which the mechanisms of the illustrative embodiments may be implemented. The DL computer model 120 is not limited to such and other applications, such as treatment recommendations in a medical domain, buy/sell recommendations in a financial domain, medical diagnosis support operations, vehicle control operations, computer security operations based on patterns of activity being recognized, and the like, may be the focus of the DL computer model 120 operations. Moreover, the input data 110 is not limited to image data and may be any type of input data for the particular implementation of the DL computer model 120, e.g., financial data, patient information, computer security event information, etc. For example, rather than modifying data in a discriminative region of an image, the mechanisms of the illustrative embodiments may perform similar operations but with collections of financial data, patient information, computer security event information, or any other suitable data such that a characteristics of a selected data element may be modified based on analysis of characteristics of other data elements within a grouping corresponding to the selected data element, thereby minimizing the influence of any perturbations in the grouping of data on an output generated by the DL computer model 120 operating on the data.

Assuming an image classification operation of the DL computer model 120, and the DL computer model 120 being a CNN, the CNN 120 is trained to output a vector output in which vector slots of the vector output comprise possible classifications of input image data. The values present in the vector slots represent the confidence or probability that the input data is properly classified in the corresponding classification. Thus, for example, if the vector output has a first vector slot corresponding to the classification "desk", and a second vector slot corresponding to the classification "cat", a value of 0.6065 in the first vector slot indicates that the CNN 120 has determined that there is a 60.65% probability that the input image that is input to the CNN 120 is an image of a desk (or stating this differently, there is a 60.65% confidence that the image is of a desk). Similarly, if there is a value of 0.0575 in the second vector slot, this indicates that the CNN 120 has determined that there is a 5.75% probability that the input image is that of a cat. Thus, the CNN 120 generates probability (or confidence) values for each of the potential classifications of the input data indicating the CNN's prediction of which classification is appropriate for the input data. These probabilities, during a training operation, may be compared to a ground truth classification for input images, such as in ground truth data structure 115, to determine the error or loss in the output of the CNN 120 and machine learning training logic 180 may be employed to evaluate this error/loss and adjust operational parameters of the CNN 120 to minimize this error/loss to a predetermined acceptable level, e.g., a threshold level of error/loss or less.

Again assuming an image classification cognitive operation being performed by the DL computer model (or CNN in this example) 120, given an output of the CNN 120, the discriminative image region identification engine 130 of the AIDAP preprocessor module 170 operates to determine the discriminative image regions in the image classification generated by the CNN 120, i.e. the region(s) of the input image data 110 that were most influential on the final classification generated by the CNN 120. As noted above, various currently available or future generated mechanisms may be utilized to identify the discriminative regions of an input image including a heat map based mechanism, a classification activation map (CAM) based mechanism, a gradient weighted CAM (Grad-CAM) mechanism, or the like. In one illustrative embodiment, the discriminative image region identification engine 130 utilizes a Grad-CAM mechanism to identify the discriminative image region(s). The Grad-CAM technique produces a visual explanation for the results generated CNNs by selecting a target class in the results and flowing the gradients back into the last convolution layer to produce a localization map that highlights the regions that are influential for the results generated with regard to that target class. This localization map may be transformed into a heat map in which various color regions indicate different levels of influence of the corresponding portions of the image to the final output of the CNN 120, e.g., a red color may be associated with portions of the image that are most important to the output generated by the CNN 120, while blue colored portions may be associated with portions that are least important to the output generated by the CNN 120. The more important portions may together constitute a discriminative image region for that target class. Other types of CNN or DNN explanation technologies may also be utilized, such as a layer-wise relevance propagation (LRP) technology, to identify the influential regions corresponding to a specific classification determination.

Thus, the discriminative image region identification engine 130 identifies a subset of elements of the input data 110, e.g., a subset (or segment) of image pixel data in the input data 110, that corresponds to the most influential regions of the input image data 110, i.e. the discriminative image region(s). The identification of the discriminative image region(s) is provided by the discriminative image region identification engine 130 to the discriminative image region transformation engine 140. The discriminative image region transformation engine 140, based on the identified discriminative image region(s), transforms the values associated with one or more pixels in the image pixel data or the discriminative image region(s) of the input image data to generate a purified input image data.

In one illustrative embodiment, the number of pixels in the discriminative image region(s) whose values are transformed, and the manner by which the pixel values are transformed, are controlled by operational parameters of the discriminative image region transformation engine 140. For example, in one illustrative embodiment, a threshold level and smoothing level operational parameter of the discriminative image region transformation engine 140 define the number of pixels and smoothing technique to utilize to transform the input image data in the discriminative image region(s). The threshold level operational parameter specifies the percentage or number of pixels in the discriminative image region(s) to transform. The smoothing level controls how to change the pixel values to eliminate adversarial factors, i.e. which smoothing technique to utilize.

For example, in one smoothing technique, the pixel value of a chosen pixel is replaced with the average pixel value of the values associated with neighboring pixels, where a neighboring pixel is one that is adjacent orthogonally and/or diagonally to the chosen pixel In another smoothing technique, the value of the chosen pixel is replaced with a randomly selected pixel value of a neighboring pixel. These are only examples of smoothing techniques and transformations that may be utilized to modify pixel values in accordance with the illustrative embodiments. Other smoothing techniques and/or transformation techniques may be utilized in addition to, or in replacement of, these smoothing techniques without departing from the spirit and scope of the illustrative embodiments.

The pixel level transformations performed by the discriminative image region transformation engine 140 transforms the pixel values for a selected subset of pixels in the discriminative image region, in accordance with the threshold operational parameter, and transforms these pixel values using a smoothing technique corresponding to the smoothing level operational parameter. These pixel-level transformations effectively eliminate the influence of adversarial perturbations that may have been added by an attacker to the discriminative image region while at the same time being guaranteed to not affect the correct classification of normal (non-adversarial) input image data. The transformed image data is provided as a purified or transformed input data 150 back to the DL computer model or CNN 120. The CNN 120 operates on the purified or transformed input data 150 which then generates a second pass output, the first pass output being the output originally generated by the CNN 120 on the original input data 110. The second pass output is an output classification of the purified or transformed input data 150 in which the adversarial input, if it were present in the discriminative image region of the input image data 110, has been eliminated since adversarial perturbations are extremely susceptible to modifications as noted above.

The first pass output is stored by the adversarial input detection engine 150 while the second pass is being performed. The second pass output generated by the CNN 120 is provided to the adversarial input detection engine 150 which compares the second pass output to the first pass output to determine if there is significant change or difference in the outputs, e.g., the classification changes. In one illustrative embodiment, this comparison may be a comparison of which classification has the highest probability or confidence value associated with it and determining if there is a difference in which classification has the highest probability or confidence value. For example, if the first pass output indicates a classification that the input image data 110 is classified as a "desk" and the second pass output indicates a classification of a "cat", then there is a significant change in the output generated by the CNN when the input data is purified. This indicates that the original input data 110 includes one or more adversarial perturbations in the discriminative image region. If the outputs are not significantly different from each other, then the discriminative image region did not have an adversarial perturbation and the original input data 110 may be considered to be a normal (non-adversarial) input.

The result of the comparison by the adversarial input detection engine 150 is provided to the responsive action engine 160 and indicates whether or not the input data 110 is normal or adversarial. Based on the determination of whether or not the input data 110 is normal or adversarial, the responsive action engine 160 automatically performs a responsive action, if necessary. In particular, if the input data 110 is determined to be a normal input, then a normal operation of the DLC computer model or CNN 120 is performed without having to make any modifications, however if the input data 110 is determined to be adversarial, then a modified operation of the machine learning training logic 180 and/or DL computer model or CNN 120 are used. The responsive action engine 160 may further output an indication of the adversarial/normal input data determination to the machine learning training logic 180 along with the appropriate output (first pass or second pass) for use in training the DL computer model or CNN 120. That is, if the input data 110 is determined to be adversarial, then the purified input and the adversarial input with a correct label may also be provided for updating the training dataset, such that the dynamically updated training dataset may be used to update the training of the CNN 120. During runtime operation, the responsive action engine 160 outputs an indication of the adversarial/normal input data determination to the source computing system along with the requested response, where the requested response is based on the first pass output if the input data is determined to be normal and is based on the second pass output if the input data is determined to be adversarial.

Thus, for example, during a runtime operation, in response to the adversarial input detection engine 150 determining that the input data 110 is a normal input data, the operation of the DL computer model and CNN 120 on the input data 110 is performed in a normal fashion such that the first pass output is utilized to provide an output to the source computing system 190 providing the input data 110 as the requested response. In response to the adversarial input detection engine 150 determining that there is a significant change in the second pass output when compared to the first pass output, i.e. the input data has an adversarial perturbation in the discriminative image region and thus, the input data 110 is an adversarial input, the responsive action engine 160 may perform various different types of actions, such as the responsive action engine 160 sending a notification to the source computing system 190 from which the input data 110 was received, indicating the fact that the input data 110 comprises adversarial perturbations. The notification may also return a requested response, however the requested response is based on the second pass output of the DL computer model or CNN 120 which was generated based on the purified input data 150 as opposed to the first pass output that was generated based on the adversarial input data 110.

Thus, the party that requested the cognitive operation of the DL computer model or CNN 120 based on the input data 110 is provided with a correct result even in the case where the input data 110 comprises adversarial perturbations in the discriminative image region by providing a response based on the purified input data 150.

In addition, as noted above, in the event that an adversarial input is found in the input data 110, this adversarial input may be used as a basis for updating a training dataset used by the machine learning training logic 180. That is, a user may be provided with the adversarial input and requested to provide a correct label, e.g., correct classification of the adversarial input, which may then be provided along with the adversarial input to the machine learning training logic 180 for inclusion in the training dataset. The dynamically updated training dataset may then be used at a later time to update the training of the DL computer model 120 through a machine learning process providing machine learning modifications to the operational parameters of the DL computer model 120. Additionally, the purified input data may also be provided, if determined to be appropriate for the implementation, for inclusion in the training dataset to augment the training dataset and improve the training of the DL computer model 120.

Thus, during runtime operation, results returned to a source computing device that provided the input data 110 are not susceptible to adversarial perturbations that may be present in the input data 110 as such perturbations are identified as being present and instead the purified (transformed) input data 150 is used to provide the results. In addition, the mechanisms of the illustrative embodiments may provide indications of whether or not the input data comprises adversarial perturbations in the discriminative image region(s) to inform a source of the input data that the input data may be compromised.

Figure 2:
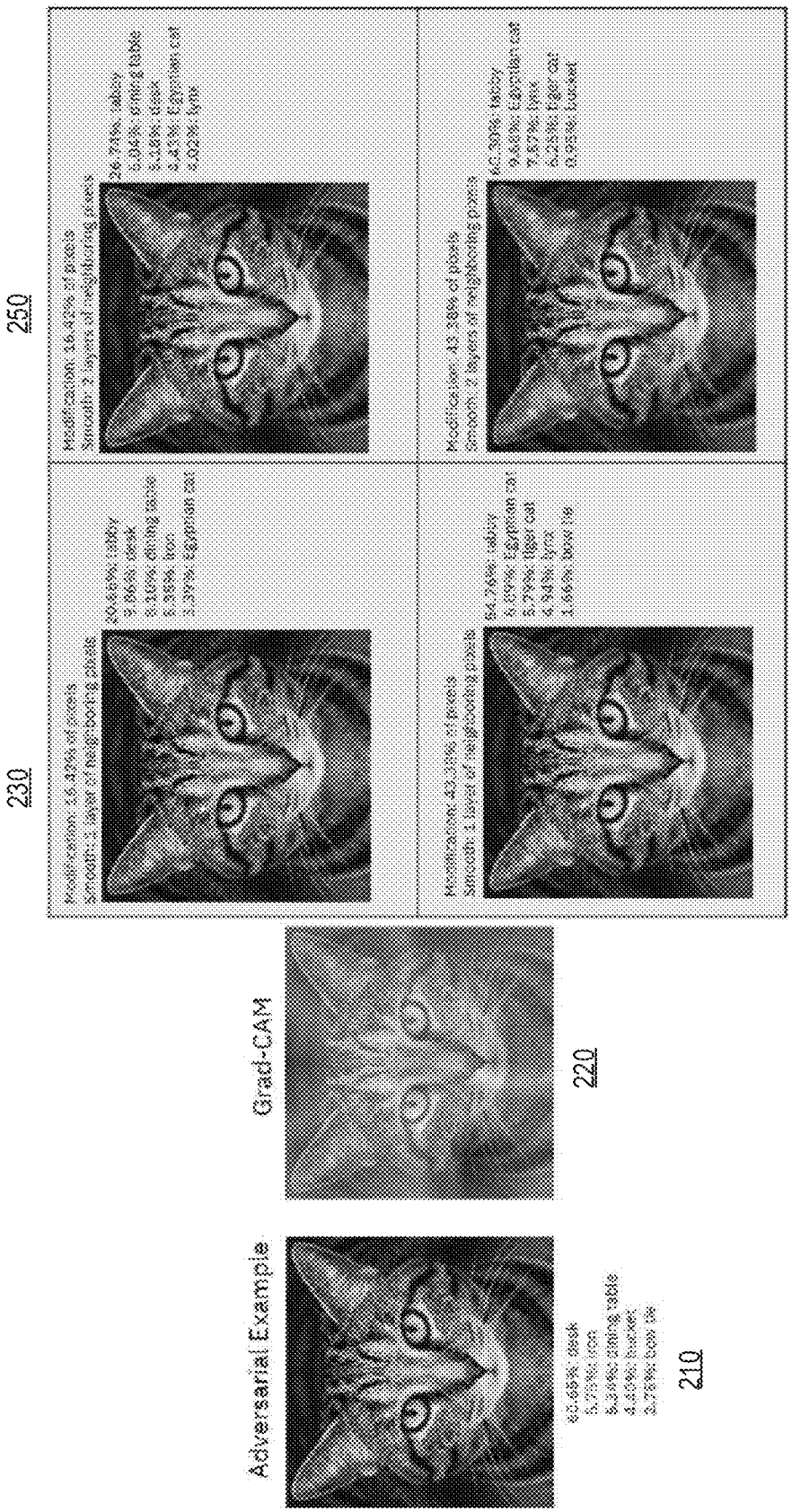
FIG. 2 depicts example diagrams showing an adversarial input image, an attributed version of the adversarial input image through Grad-CAM, and corresponding purified image input examples in accordance with one or more illustrative embodiments.

FIG. 2 depicts example diagrams showing an adversarial input image, a Grad-CAM version of the adversarial input image, and corresponding purified image input examples in accordance with one or more illustrative embodiments. As shown in FIG. 2, the original input image 210 comprises an adversarial perturbation that is imperceptible to the human eye but which causes an incorrect output of a DL computer model. In the depicted example, the original image is of a cat, however due to the adversarial perturbation in the discriminative image region, the classification output by the DL computer model is that the input image 210 is of a "desk".

A Grad-CAM version of the adversarial input image 210 is shown as element 220. Elements 230-260 are purified images 230-260 which show various levels of transformations or purifications of the input image 210 based on the setting of operational parameters of the discriminative image region transformation engine 140. For example, purified image 230 corresponds to a threshold parameter setting of 16.42% of the pixels in the discriminative image region being modified or transformed, with the transformation or modification smoothing parameter being 1 layer of neighboring pixels. The corresponding classification probability or confidence scores are shown, where in this case, the proper classification of a "tabby" cat is generated by the DL computer model or CNN. In the depicted example, 1 layer of smoothing means that the 8 pixels surrounding a selected pixel are used as a basis for generating the characteristic value, e.g., pixel value, for the selected pixel. For 2 layer smoothing, the 8 pixels are used along with the next set of surrounding pixels, i.e. the 17 additional pixels surrounding the selected pixel and its 8 neighboring pixels, are used to perform the smoothing and set the characteristic value for the selected pixel. It should be appreciated that while 1 and 2 layer smoothing are used in the depicted example, any number of layers of smoothing may be used without departing from the spirit and scope of the present invention.

Purified image 240 shows another purified image with the threshold parameter setting of 43.38% and smoothing parameter being 1 layer of neighboring pixels. Purified image 250 shows yet another purified image with the threshold parameter setting of 16.42% and a smoothing parameter being 2 layers of neighboring pixels. Similarly, purified image 260 shows another purified image with the threshold parameter setting of 43.38% and smoothing parameter being 2 layers of neighboring pixels. From these purified images and their corresponding classification results, one can see that using a larger threshold parameter, i.e. larger number of pixels in the discriminative image region being modified, and a 2-layer smoothing parameter, a more accurate classification of the input image, even if the input image comprises an adversarial perturbation, is obtained. As noted above, this correct classification of the input image based on the purification or transformation of adversarial input images may be performed during runtime, or prediction time, operation of the DL computer model.

Figure 3:
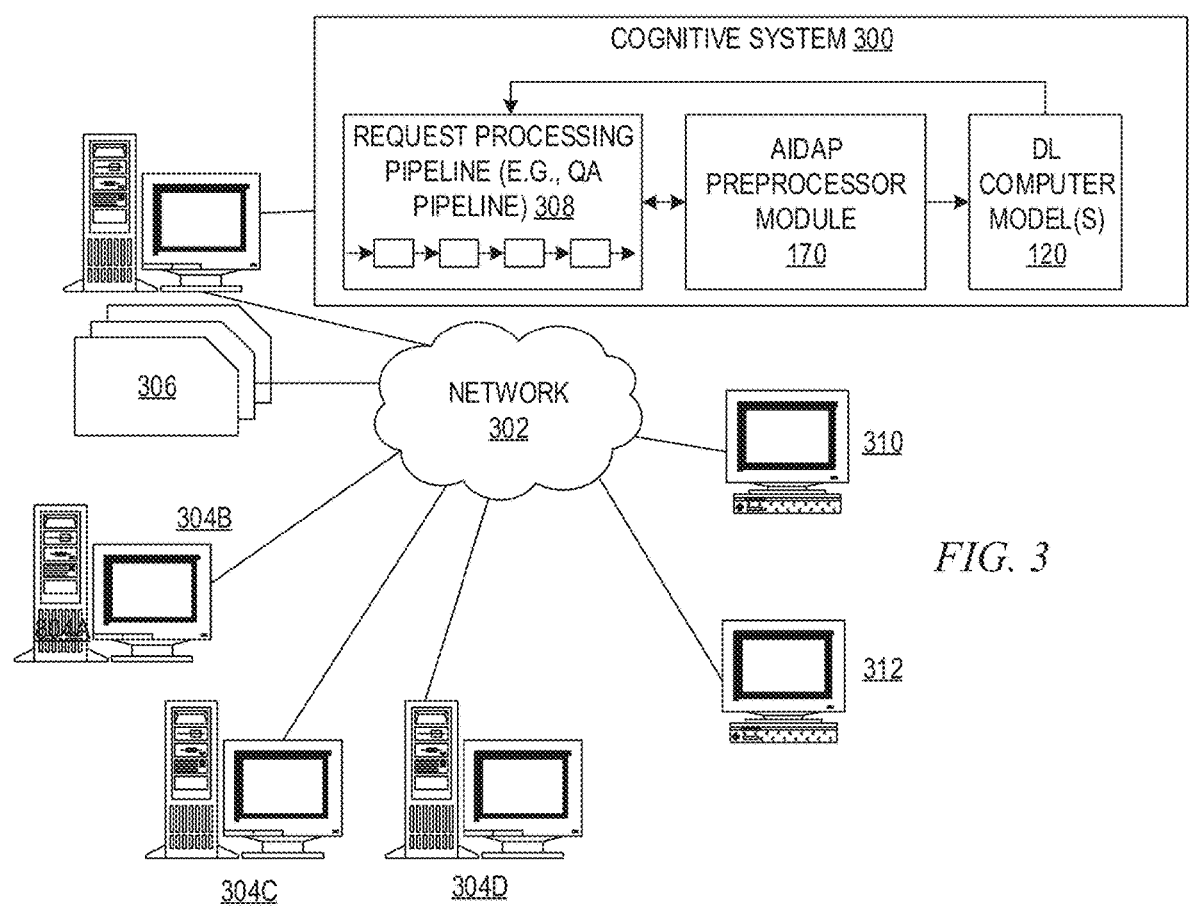
FIG. 3 depicts a schematic diagram of one illustrative embodiment of a distributed data processing system in which aspects of the present invention may be implemented.
Figure 4:
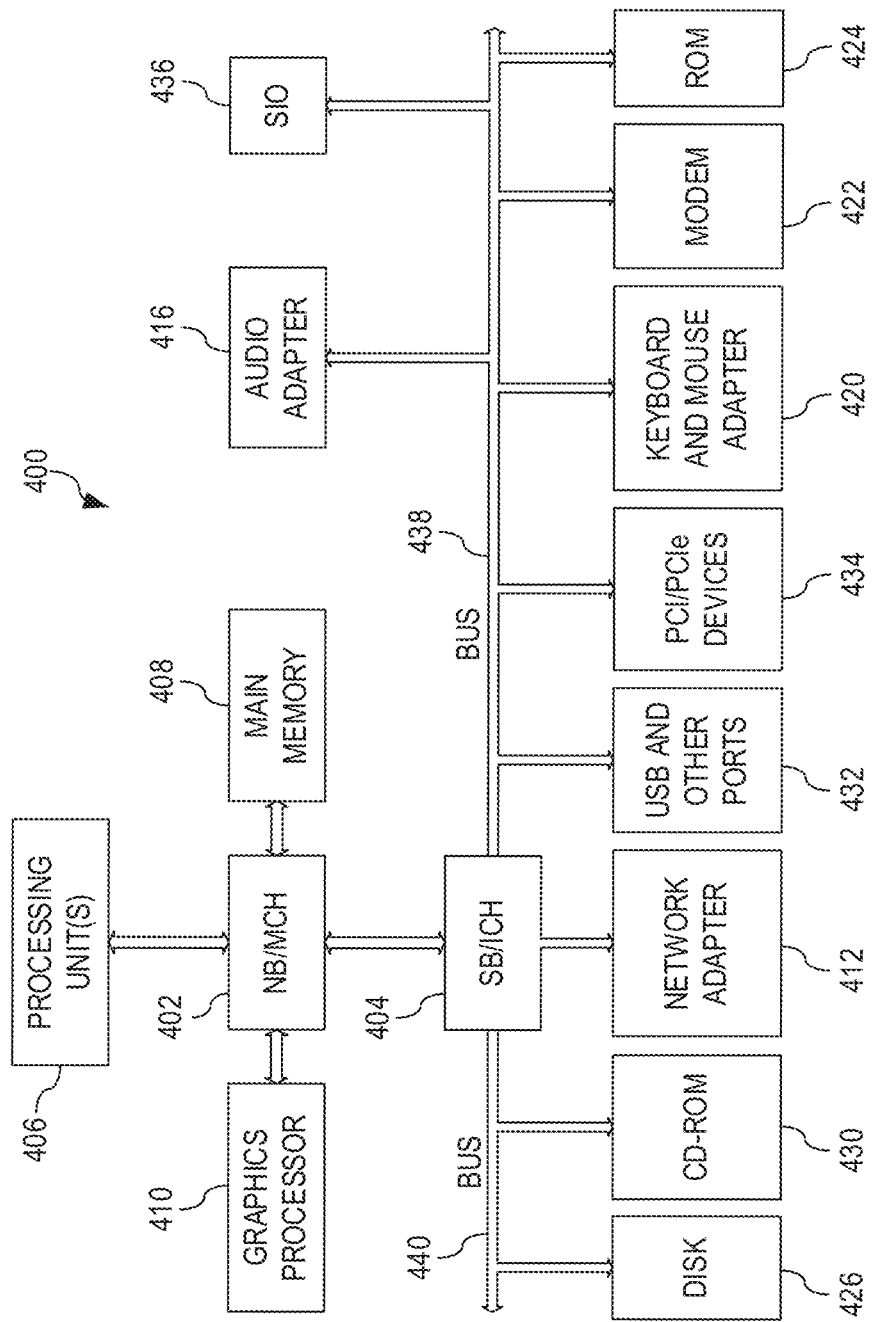
FIG. 4 is a block diagram of an example data processing system in which aspects of the illustrative embodiments are implemented.

As discussed previously, the mechanisms of the illustrative embodiments are directed to an improved computer tool that implements an adversarial input detection and purification (AIDAP) preprocessor module mechanism that operates to detect whether input data comprises an adversarial input and if so purify that input with regard to either training the DL computer model(s), runtime results generation by the DL computer model(s), or both. As such, the illustrative embodiments may be utilized in many different types of data processing environments. In order to provide a context for the description of the specific elements and functionality of the illustrative embodiments, FIGS. 3-4 are provided hereafter as example environments in which aspects of the illustrative embodiments may be implemented. It should be appreciated that FIGS. 3-4 are only examples and are not intended to assert or imply any limitation with regard to the environments in which aspects or embodiments of the present invention may be implemented. Many modifications to the depicted environments may be made without departing from the spirit and scope of the present invention.

The mechanisms of the illustrative embodiments may be implemented in and by a computing system specifically configured with the operational elements previously described above with regard to FIG. 1 to thereby render the computing system a specific or special purpose computing system. The computing system may operate solely to evaluate input data being used with a DL computer model, detect adversarial inputs, and purify those adversarial inputs. In other illustrative embodiments, the mechanisms of the illustrative embodiments may operate in conjunction with or as part of a cognitive computing system that utilizes the computer model(s) to perform classification operations or other cognitive operations upon which other operations of the cognitive computing system may operate. That is, a cognitive computing system may implement a request processing pipeline in which one or more DL computer model(s) are employed to perform cognitive evaluations of input data, such as classifying the input data into one or more predetermined classes, which may influence other operations performed by the request processing pipeline, e.g., based on an image classification, additional operations are performed to control performance of actions, control access to resources, or the like.

With regard to a cognitive computing system architecture embodiment, as mentioned above, the cognitive computing system implements a request processing pipeline, request processing methodology, and request processing computer program product with which the mechanisms of the illustrative embodiments are implemented. These requests may be provided as structured or unstructured request messages, natural language questions, or any other suitable format for requesting an operation to be performed by the cognitive system. In some illustrative embodiments, the requests may be in the form of input data sets that are to be classified in accordance with a cognitive classification operation performed by a machine learning, neural network, deep learning, or other artificial intelligence based model that is implemented by the cognitive system. The input data sets may represent various types of input data depending upon the particular implementation, such as audio input data, image input data, textual input data, or the like. For example, in one possible implementation, the input data set may represent a medical image, such as an x-ray image, CT scan image, MRI image, or the like, that is to have portions of the image, or the image as a whole, classified into one or more predefined classifications. In other possible implementations, the input data set may represent facial images, images of text, biometric images, camera captured images of an environment, such as in a vehicle mounted camera system, natural language textual content, or any other type of input that may be represented as data and for which a classification operation is to be performed so as to perform a cognitive operation by a cognitive system.

It should be appreciated that classification of input data may result in a labeled set of data that has labels or annotations representing the corresponding classes into which the non-labeled input data set is classified. This may be an intermediate step in performing other cognitive operations by the cognitive system that support decision making by human users, e.g., the cognitive system may be a decision support system, or by other automated mechanisms, such as vehicle control and/or safety systems. For example, in a medical domain, the cognitive system may operate to perform medical image analysis to identify anomalies for identification to a clinician, patient diagnosis and/or treatment recommendation, drug interaction analysis, or any of a plethora of other possible decision support operations. In a security domain, the cognitive system may operate to control access to physical premises, data assets, computing assets, or any other type of asset to which access is to be restricted. In a vehicle control and/or safety system, the cognitive system may operate to control other systems of the vehicle to maintain the safety of the vehicle and its passengers, such as automatic braking, steering, and the like. In other domains, the cognitive system may perform different types of decision making operations or decision support operations based on the desired implementation.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, in some cases, a first request processing pipeline may be trained to operate on input requests directed to a medical image analysis, while a second request processing pipeline may be configured and trained to operate on input requests concerning patient electronic medical record (EMR) analysis involving natural language processing. In other cases, for example, the request processing pipelines may be configured to provide different types of cognitive functions or support different types of applications, such as one request processing pipeline being used for patient treatment recommendation generation, while another pipeline may be trained for financial industry based forecasting, etc.

Moreover, each request processing pipeline may have their own associated corpus or corpora that they ingest and operate on, e.g., one corpus for medical treatment documents and another corpus for financial industry domain related documents in the above examples. In some cases, the request processing pipelines may each operate on the same domain of input requests but may have different configurations, e.g., different annotators or differently trained annotators, such that different analysis and potential results are generated. The cognitive system may provide additional logic for routing input requests to the appropriate request processing pipeline, such as based on a determined domain of the input request, combining and evaluating final results generated by the processing performed by multiple request processing pipelines, and other control and interaction logic that facilitates the utilization of multiple request processing pipelines.

The illustrative embodiments may be integrated in, augment, and extend the functionality of these request processing pipeline by providing mechanisms to evaluate input data sent to the request processing pipeline, detect adversarial inputs in the input data, and purify those adversarial inputs. In particular, in portions of the cognitive system in which the trained neural network models, machine learning models, deep learning models, or the like, are employed to generate labeled data set outputs, the mechanisms of the illustrative embodiments may be implemented to train the neural network or other deep learning or cognitive computer model so as to train the neural network/DL computer model using only normal and/or purified inputs, thereby eliminating adversarial inputs from being used to train the neural network/DL computer model and minimizing the likelihood that the trained neural network/DL computer model will be trained to misclassify an input when an adversarial perturbation is present. Moreover, during runtime operation, the detection of the adversarial inputs may be used to purify the input and generate results based on the purified input rather than the adversarial input, as discussed previously.

As the mechanisms of the illustrative embodiments may be part of a cognitive system and may improve the operation of the cognitive system by protecting it from adversarial attacks through hardening of the computer models against such adversarial attacks via the detection and purification preprocessing mechanisms, it is important to have an understanding of how cognitive systems implementing a request processing pipeline is implemented. It should be appreciated that the mechanisms described in FIGS. 3-4 are only examples and are not intended to state or imply any limitation with regard to the type of cognitive system mechanisms with which the illustrative embodiments are implemented. Many modifications to the example cognitive system shown in FIGS. 3-4 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. This logic may implement one or more computer models, such as a neural network model, a machine learning model, a deep learning model, that may be trained for particular purposes for supporting the particular cognitive operations performed by the cognitive system. In accordance with the mechanisms of the illustrative embodiments, the logic further implements an AIDAP preprocessor module 170 for detecting adversarial inputs and purifying that adversarial input, and in some cases actually generate an expanded training dataset and training the DL computer model or neural network to be hardened against such adversarial attacks. In this way, the AIDAP preprocessor module 170 fortifies the cognitive computing system from adversarial attacks.

The logic of the cognitive system implements the cognitive computing operation(s), examples of which include, but are not limited to, question answering, identification of related concepts within different portions of content in a corpus, security operations for controlling access to premises or assets, intelligent search algorithms, such as Internet web page searches, for example, medical diagnostic and treatment recommendations, other types of recommendation generation, e.g., items of interest to a particular user, potential new contact recommendations, etc., image analysis, audio analysis, vehicle system controls, and the like. The types and number of cognitive operations that may be implemented using the cognitive system of the illustrative embodiments are vast and cannot all be documented herein. Any cognitive computing operation emulating decision making and analysis performed by human beings, but in an artificial intelligence or cognitive computing manner, is intended to be within the spirit and scope of the present invention.

IBM Watson™ is an example of one such cognitive computing system which can process human readable language and identify inferences between text passages with human-like high accuracy at speeds far faster than human beings and on a larger scale. In general, such cognitive systems are able to perform the following functions:

Navigate the complexities of human language and understanding
Ingest and process vast amounts of structured and unstructured data
Generate and evaluate hypothesis
Weigh and evaluate responses that are based only on relevant evidence
Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice) (memorization and recall)
Predict and sense with situational awareness that mimic human cognition based on experiences
Answer questions based on natural language and specific evidence In one aspect, cognitive computing systems (or simply "cognitive systems") provide mechanisms for processing input data to perform a cognitive operation, such as answering questions posed to these cognitive systems and/or process requests which may or may not be posed as natural language questions. The request processing pipeline and/or cognitive computing system comprises one or more artificial intelligence applications executing on data processing hardware that process requests, which may be formulated in structured or unstructured manner, as input data with implied requests for performance of the cognitive operations, or the like. The request processing pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the request processing pipeline. The document may include any file, text, article, or source of data for use in the cognitive computing system. For example, a request processing pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain. In some illustrative embodiments, the corpus or corpora may comprise image data for processing by the cognitive computing system, and in accordance with the mechanisms described above, may include a training dataset and adversarial attack input data for evaluation.

Content users, which may be human beings or automated computing systems, input requests to the cognitive system which implements the request processing pipeline. The request processing pipeline then processes the requests using the content in the corpus of data by evaluating documents, sections of documents, portions of data in the corpus, images, or the like. When a process evaluates a given section of a document for semantic content, the process can use a variety of conventions to query such document from the request processing pipeline, e.g., sending the query to the request processing pipeline as a well-formed question which is then interpreted by the request processing pipeline and a response is provided. Semantic content is content based on the relation between signifiers, such as words, phrases, signs, and symbols, and what they stand for, their denotation, or connotation. In other words, semantic content is content that interprets an expression, such as by using Natural Language Processing.

The request processing pipeline receives an input, parses the input to extract the major features of the input, uses the extracted features to formulate queries, and then applies those queries to the corpus of data. Based on the application of the queries to the corpus of data, the request processing pipeline generates a set of hypotheses, or candidate results, by looking across the corpus of data for portions of the corpus of data that have some potential for containing a valuable response to the input and expressed or implied request. The request processing pipeline then performs deep analysis on the content of the input and each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, image analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity. Still others may perform image processing and classification operations on input images in the input request to thereby classify the image into one of a plurality of predefined image classifications using a computer model, such as a DNN, CNN, or other machine learning or deep learning computer model.

The scores obtained from the various reasoning algorithms indicate the extent to which the potential response is inferred by the input based on the specific area of focus of that reasoning algorithm. Each resulting score is then weighted against a statistical model. The statistical model captures how well the reasoning algorithm performed at establishing the inference between two similar portions of content for a particular domain during the training period of the request processing pipeline. The statistical model is used to summarize a level of confidence that the request processing pipeline has regarding the evidence that the potential response is inferred by the input. This process is repeated for each of the candidate results until the request processing pipeline identifies candidate results that surface as being significantly stronger than others and thus, generates a final result, or ranked set of results, for the input request, which in some implementations may be a control signal sent to other computer systems, actuators, or other electronics to control the operation of another system, e.g., in a vehicle control and safety system, the result may be a control signal sent to an automatic braking system, automatic steering system, obstacle avoidance system, dashboard warning systems, or the like.

FIG. 3 depicts a schematic diagram of one illustrative embodiment of a distributed data processing system in which a cognitive computing system 300 implementing a request processing pipeline 308 is provided in a computer network 302. While the cognitive computing system 300 may be configured for a variety of different purposes depending on the desired implementation, e.g., image analysis, facial recognition, vehicle control, question answering, cognitive content searches, and the like, it will be assumed for purposes of the present description that the cognitive computing system 300 is configured to perform image analysis operations, which may include any image analysis operations including, but not limited to, facial recognition, biometric based access control, e.g., fingerprint or retina scan access control, camera based object identification and corresponding controls, such as vehicle controls, or the like. In the case of a vehicle control mechanism, the cognitive computing system may be implemented in an on-board computing system of the vehicle and thus, may operate wirelessly from the other depicted computing systems in FIG. 3.

The cognitive system 300 is implemented on one or more computing devices 304A-D (comprising one or more processors and one or more memories, and potentially any other computing device elements generally known in the art including buses, storage devices, communication interfaces, and the like) connected to the computer network 302. For purposes of illustration only, FIG. 3 depicts the cognitive system 300 being implemented on computing device 304A only, but as noted above the cognitive system 300 may be distributed across multiple computing devices, such as a plurality of computing devices 304A-D. The network 302 includes multiple computing devices 304A-D, which may operate as server computing devices, and 310-312 which may operate as client computing devices, in communication with each other and with other devices or components via one or more wired and/or wireless data communication links, where each communication link comprises one or more of wires, routers, switches, transmitters, receivers, or the like. Other embodiments of the cognitive system 300 may be used with components, systems, sub-systems, and/or devices other than those that are depicted herein.

The cognitive computing system 300 is configured to implement a request processing pipeline 308 that receive inputs from various sources. The requests may be posed in the form of a structured or unstructured (e.g., natural language) requests for the performance of a cognitive operation, or the like. Alternatively, the "request" may simply be the input of data that is intended to be operated on by the cognitive computing system 300, e.g., images, text, audio input, or the like, which is to be classified by the hardened model of the illustrative embodiments and then operated on by cognitive processes to generate a result of a cognitive operation. For example, the cognitive system 300 receives input from the network 302, a corpus or corpora of electronic documents 306, cognitive system users, image capture devices, audio capture devices, biometric scanners, textual message interception devices, and/or other data sources and other possible sources of input.

In one embodiment, some or all of the inputs to the cognitive system 300 are routed through the network 302. The various computing devices 304A-D on the network 302 include access points for content creators and cognitive system users, both of which may be human creators/users or other computing systems operating automatically, semi-automatically, or with manual intervention by a user. Some of the computing devices 304A-D include devices for a database storing the corpus or corpora of data 306 (which is shown as a separate entity in FIG. 3 for illustrative purposes only). Portions of the corpus or corpora of data 306 may also be provided on one or more other network attached storage devices, in one or more databases, or other computing devices not explicitly shown in FIG. 3. The network 302 includes local network connections and remote connections in various embodiments, such that the cognitive system 300 may operate in environments of any size, including local and global, e.g., the Internet.

Depending on the particular domain and implementation of the cognitive system, the corpus or corpora of data 306 may take many different forms. In a natural language implementation, the corpus or corpora 306 may be composed of natural language unstructured documents, structured documents, or the like. In a domain in which image analysis is being performed, the corpus or corpora 306 may include image data for various types of entities. In an audio analysis domain, the corpus or corpora 306 may contain audio patterns representing different entities or sources of audible sounds. The content of the corpus or corpora 306 may vary depending on the type of data needed to perform cognitive operations.

In one embodiment, the content creator creates content in a document of the corpus or corpora of data 306 for use as part of a corpus of data with the cognitive system 300. The document includes any file, text, article, or source of data for use in the cognitive system 300. Cognitive system users access the cognitive system 300 via a network connection or an Internet connection to the network 302, and input requests to the cognitive system 300 that are processed based on the content in the corpus or corpora of data 306. The cognitive system 300 parses and interprets the request via the request processing pipeline 308, and provides a response to the cognitive system user, e.g., cognitive system user 310, containing one or more results of processing the request. In some embodiments, the cognitive system 300 provides a response to users in a ranked list of candidate responses while in other illustrative embodiments, the cognitive system 300 provides a single final response or a combination of a final response and ranked listing of other candidate responses.

The cognitive system 300 implements the pipeline 308 which comprises a plurality of stages for processing an input request based on information obtained from the corpus or corpora of data 306. The pipeline 308 generates responses for the input request based on the processing of the input request and the corpus or corpora of data 306.

In some illustrative embodiments, the cognitive system 300 may be the IBM Watson™ cognitive system available from International Business Machines Corporation of Armonk, N.Y., which is augmented with the mechanisms of one or more of the illustrative embodiments described herein. More information about the request processing pipeline of the IBM Watson™ cognitive system may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 300 from a client device may be posed in the form of a structured or unstructured (e.g., natural language) requests. That is, the input may be formatted or structured as any suitable type of request, or simply as a set of input data to be processed, which may be parsed and analyzed using structured and/or unstructured input analysis, including but not limited to natural language parsing and analysis mechanisms of a cognitive system such as IBM Watson, to determine the basis upon which to perform cognitive analysis and providing a result of the cognitive analysis. Such processing may alternatively, or in addition, include image analysis, audio analysis, textual image analysis, biometrics analysis, or any other type of cognitive analysis that utilizes neural network, machine learning, or other cognitive models which may be trained and hardened against adversarial attacks in accordance with the illustrative embodiments.

The processing of the request involves the application of a trained model, e.g., neural network model, machine learning model, deep learning (cognitive) model, etc., to an input data set as described previously above. This input data set may represent features of the actual request itself, data submitted along with the request upon which processing is to be performed, or the like. The application of the trained model to an input data set may occur at various points during the performance of the cognitive computing operations by the cognitive system. For example, the trained model may be utilized during feature extraction and classification by a feature extraction stage of processing of the request, e.g., taking a natural language term in the request and classifying it as one of a plurality of possible concepts that the term corresponds to, e.g., classifying the term "truck" in an input request into a plurality of possible classes, one of which may be "vehicle". As another example, a portion of an image comprising a plurality of pixel data may have the trained model applied to it to determine what the object is that is in the portion of the image or classify the image as a whole. The mechanisms of the illustrative embodiments operate on the input data to determine whether the input data comprises adversarial input, and if so, purifies that input data to minimize the effects of the adversarial input data on the training and/or runtime operation of the computer model.

As shown in FIG. 3, the cognitive system 300 is further augmented, in accordance with the mechanisms of the illustrative embodiments, to include the AIDAP preprocessor module 170, such as described previously with regard to FIG. 1, which operates on input data provided for processing by one or more computer models 120 implemented in, or associated with, the request processing pipeline 308. The AIDAP preprocessor module 170 may be provided as an external engine that is external to the logic implementing the request processing pipeline 308 and/or DL computer model(s) 120. The AIDAP preprocessor module 170 operates to detect adversarial inputs in the input data and purify those adversarial inputs such that the DL computer model 120 operation is not rendered incorrect due to the presence of adversarial perturbations, either during training or during runtime operation. In one illustrative embodiment, this is accomplished, as described above, by processing the input data via the DL computer model 120, determining the discriminative image region(s), transforming or purifying the data in the discriminative image region(s), processing the transformed or purified input data via the DL computer model 120, comparing the outputs generated by the DL computer model 120 with regard to the original input data (first pass) and the transformed or purified input data (second pass) to detect whether or not the input data includes adversarial perturbations, and then performing an appropriate responsive action. Thus, correct classification and labeling of the input data set is performed while protecting or hardening the computer model (e.g., neural network) against adversarial attacks, such as evasion attacks. The resulting classified or labeled data set may be provided to further stages of processing downstream in the request processing pipeline 308 for further processing and performance of the overall cognitive operation for which the cognitive system 300 is employed.

It should be appreciated that while FIG. 3 illustrates the implementation of AIDAP preprocessor module 170 and the DL computer model(s) 120 as part of a cognitive system 300, the illustrative embodiments are not limited to such. Rather, in some illustrative embodiments, the AIDAP preprocessor module 170 and DL computer model(s) 120 may themselves be provided as a service from which a user of a client computing device 310, may request processing of an input data set. Moreover, other providers of services, which may include other cognitive systems, may utilize the AIDAP preprocessor module 170 and/or DL computer model(s) 120 to augment the operation of their own cognitive systems. Thus, in some illustrative embodiments the AIDAP preprocessor module 170 and/or DL computer model(s) 120 may be implemented in one or more server computing devices, accessed via one or more APIs via other computing devices through which input data sets are submitted to the AIDAP preprocessor module 170 and/or DL computer model(s) 120, and corresponding notifications of adversarial input data, trained or hardened computer models (such as from the APAS 330), and/or correctly labeled data sets (such as from the hardened model 360) are returned. Thus, the integration of the mechanisms of the illustrative embodiments into a cognitive system 300 is not required, but may be performed depending on the desired implementation.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

FIG. 4 is a block diagram of an example data processing system in which aspects of the illustrative embodiments are implemented. Data processing system 400 is an example of a computer, such as a server computing device 304A-D or client computing device 310 in FIG. 3, in which computer usable code or instructions implementing the processes for illustrative embodiments of the present invention are located. In one illustrative embodiment, FIG. 4 represents a server computing device, such as a server 304A, which implements a cognitive system 300 and request processing pipeline 308 augmented to include the additional mechanisms of the illustrative embodiments described herein with regard to FIG. 3 for evaluating the sensitivity of a computer model to adversarial attack perturbations, generating a visualization of such sensitivities, generating an expanded training dataset, and/or training the computer model to harden it against such adversarial attacks.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 is connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 is connected to SB/ICH 404.

An operating system runs on processing unit 406. The operating system coordinates and provides control of various components within the data processing system 400 in FIG. 4. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM® eServer™ System p° computer system, running the Advanced Interactive Executive) (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and are loaded into main memory 408 for execution by processing unit 406. The processes for illustrative embodiments of the present invention are performed by processing unit 406 using computer usable program code, which is located in a memory such as, for example, main memory 408, ROM 424, or in one or more peripheral devices 426 and 430, for example.

A bus system, such as bus 438 or bus 440 as shown in FIG. 4, is comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, includes one or more devices used to transmit and receive data. A memory may be, for example, main memory 408, ROM 424, or a cache such as found in NB/MCH 402 in FIG. 4.

Those of ordinary skill in the art will appreciate that the hardware depicted in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
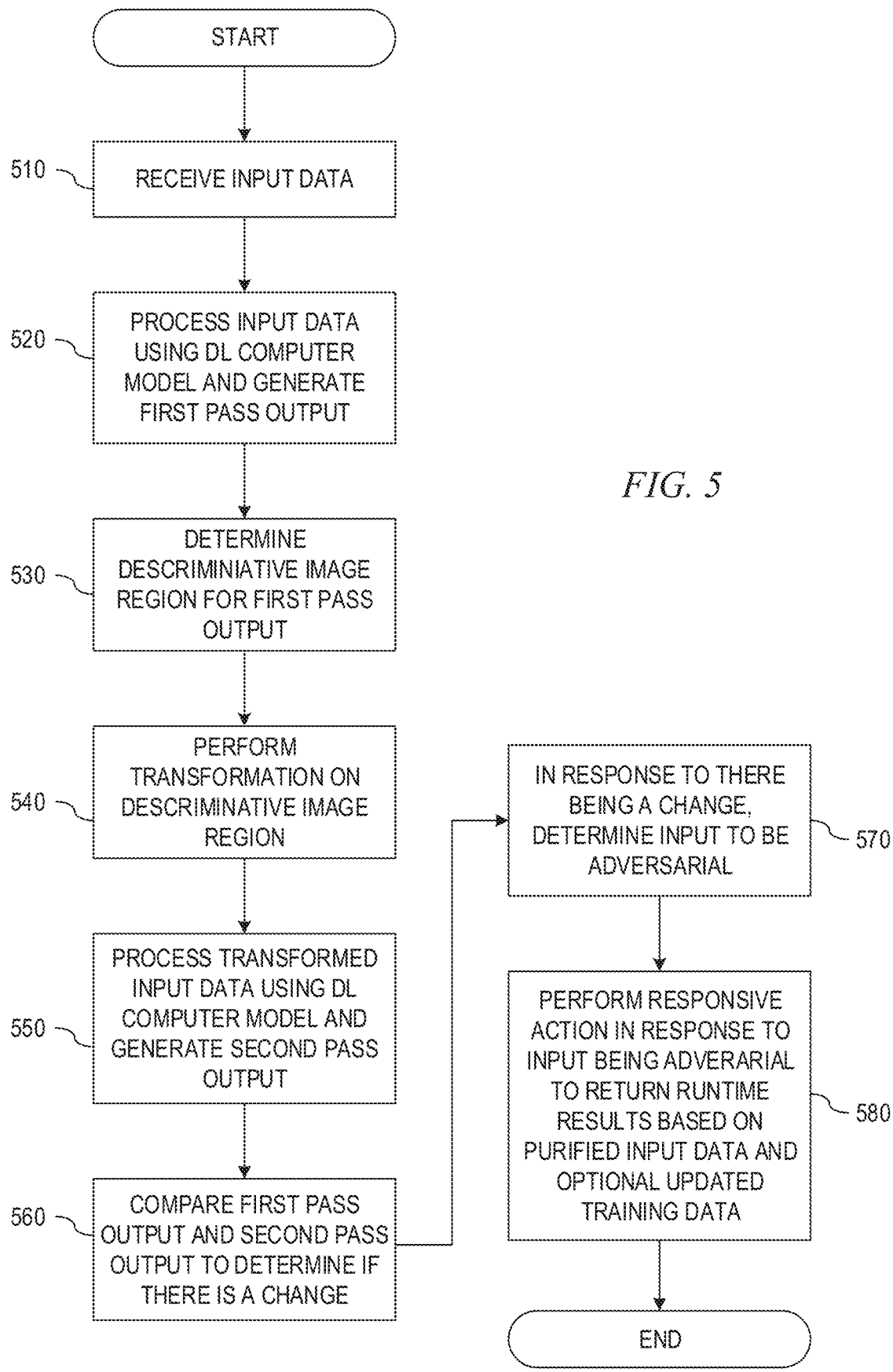
FIG. 5 is a flowchart outlining an example operation for detecting and purifying adversarial input data in accordance with one illustrative embodiment.

FIG. 5 is a flowchart outlining an example operation for detecting and purifying adversarial input data in accordance with one illustrative embodiment. As shown in FIG. 5, the operation starts by receiving input data which may or may not comprise adversarial input (step 510). The input data is processed using a DL computer model in order to generate a first pass output based on the original, non-purified or transformed, input data (step 520). Based on the first pass output and the operation of the DL computer model, a discriminative image region for the input data is determined (step 530). A transformation of elements, e.g., pixels, in the discriminative image region is performed so as to purify the discriminative image region (step 540). The modified input data comprising the transformed or purified discriminative image region is then processed by the DL computer model again as part of a second pass to generate a second pass output (step 550). The first pass output and second pass output are compared to determine if there is a difference in the output indicative of an adversarial perturbation having been present in the original input data (step 560). In response to there being a difference or change in the outputs, the input data is determined to be an adversarial input (step 570) and a responsive action is performed in response to the input being adversarial to return runtime results based on the purified or transformed input data and optionally provide the adversarial input for updating a training dataset (step 580). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor to specifically configure the at least one processor to implement an adversarial input detection and purification (AIDAP) preprocessor and a deep learning computer model, the method comprising:
   receiving, by the deep learning computer model, input data for processing by the deep learning computer model;
   processing, by the deep learning computer model, the input data to generate a first pass output that is output to the AIDAP preprocessor;
   determining, by the AIDAP preprocessor, a discriminative region of the input data based on the first pass output, wherein the discriminative region is a portion of the input data that is determined to have a significant influence on the operation of the deep learning computer model in generating the first pass output;
   transforming, by the AIDAP preprocessor, a subset of elements in the discriminative region of the input data to modify a characteristic of the elements in the subset of elements and generate a transformed input data;
   processing, by the deep learning computer model, the transformed input data to generate a second pass output that is output to the AIDAP preprocessor;
   detecting, by the AIDAP preprocessor, that the input data comprises an adversarial input or is a non-adversarial input based on a comparison of the first pass output with the second pass output; and
   in response to the AIDAP preprocessor detecting the input data comprises an adversarial input, performing a responsive action that mitigates effects of the adversarial input.

2. The method of claim 1, wherein the deep learning computer model is a deep learning neural network that is configured to perform an image classification operation, and wherein the input data is input image data.

3. The method of claim 1, wherein determining the discriminative region comprises:
   using a gradient weighted classification activation map to generate a heatmap to mark importance of segments of the input data for each classification in a predetermined set of classifications; and
   determining the discriminative region based on segments of the input data having a greatest importance to one or more of the classifications in the predetermined set of classifications.

4. The method of claim 1, wherein the subset of elements in the discriminative region of the input data has a number of elements determined based on a threshold parameter associated with the AIDAP preprocessor.

5. The method of claim 1, wherein, for each element in the subset of elements, modifying the characteristic comprises modifying the characteristic of the element to have a value corresponding to one or more neighboring elements in the discriminative region.

6. The method of claim 1, wherein, for each element in the subset of elements, modifying the characteristic comprises modifying the characteristic of the element to have a value corresponding to an average value of a same characteristic associated with a plurality of neighboring elements in the discriminative region.

7. The method of claim 1, wherein, for each element in the subset of elements, modifying the characteristic comprises modifying the characteristic of the element to have a value corresponding to a value of a same characteristic associated with a randomly selected neighboring element in the discriminative region.

8. The method of claim 1, wherein the input data is a digital image, the elements in the subset of elements are pixels of the digital image, and the characteristic is a pixel value for a corresponding pixel.

9. The method of claim 1, wherein the AIDAP preprocessor is configured with at least one transformation threshold operational parameter and at least one corresponding smoothing level operational parameter, and wherein transforming, by the AIDAP preprocessor, the subset of elements in the discriminative region of the input data comprises selecting the subset of elements in accordance with a percentage of elements specified by the at least one transformation threshold operational parameter, and applying a smoothing technique specified by the at least one corresponding smoothing level operational parameter to the selected subset of elements.

10. The method of claim 1, further comprising, in response to detecting that the input data comprises an adversarial input:
updating a training dataset for training the deep learning computer model to include the adversarial input and a correct classification of the adversarial input, and thereby generate an updated training dataset; and
retraining the deep learning computer model based on the updated training dataset.

11. A computer program product comprising a computer readable storage medium having a computer readable program stored therein, wherein the computer readable program, when executed on a data processing system, causes the data processing system to implement an adversarial input detection and purification (AIDAP) preprocessor and a deep learning computer model, which operate to:
receive, by the deep learning computer model, input data for processing by the deep learning computer model;
process, by the deep learning computer model, the input data to generate a first pass output that is output to the AIDAP preprocessor;
determine, by the AIDAP preprocessor, a discriminative region of the input data based on the first pass output, wherein the discriminative region is a portion of the input data that is determined to have a significant influence on the operation of the deep learning computer model in generating the first pass output;
transform, by the AIDAP preprocessor, a subset of elements in the discriminative region of the input data to modify a characteristic of the elements in the subset of elements and generate a transformed input data;
process, by the deep learning computer model, the transformed input data to generate a second pass output that is output to the AIDAP preprocessor;
detect, by the AIDAP preprocessor, that the input data comprises an adversarial input or is a non-adversarial input based on a comparison of the first pass output with the second pass output; and
in response to the AIDAP preprocessor detecting the input data comprises an adversarial input, perform a responsive action that mitigates effects of the adversarial input.

12. The computer program product of claim 11, wherein the deep learning computer model is a deep learning neural network that is configured to perform an image classification operation, and wherein the input data is input image data.

13. The computer program product of claim 11, wherein determining the discriminative region comprises:
using a gradient weighted classification activation map to generate a heatmap to mark importance of segments of the input data for each classification in a predetermined set of classifications; and
determining the discriminative region based on segments of the input data having a greatest importance to one or more of the classifications in the predetermined set of classifications.

14. The computer program product of claim 11, wherein the subset of elements in the discriminative region of the input data has a number of elements determined based on a threshold parameter associated with the AIDAP preprocessor.

15. The computer program product of claim 11, wherein, for each element in the subset of elements, modifying the characteristic comprises modifying the characteristic of the element to have a value corresponding to one or more neighboring elements in the discriminative region.

16. The computer program product of claim 11, wherein, for each element in the subset of elements, modifying the characteristic comprises modifying the characteristic of the element to have a value corresponding to an average value of a same characteristic associated with a plurality of neighboring elements in the discriminative region.

17. The computer program product of claim 11, wherein, for each element in the subset of elements, modifying the characteristic comprises modifying the characteristic of the element to have a value corresponding to a value of a same characteristic associated with a randomly selected neighboring element in the discriminative region.

18. The computer program product of claim 11, wherein the AIDAP preprocessor is configured with at least one transformation threshold operational parameter and at least one corresponding smoothing level operational parameter, and wherein transforming, by the AIDAP preprocessor, the subset of elements in the discriminative region of the input data comprises selecting the subset of elements in accordance with a percentage of elements specified by the at least one transformation threshold operational parameter, and applying a smoothing technique specified by the at least one corresponding smoothing level operational parameter to the selected subset of elements.

19. The computer program product of claim 11, wherein the computer readable program, in response to detecting that the input data comprises an adversarial input, further causes the AIDAP preprocessor to:
update a training dataset for training the deep learning computer model to include the adversarial input and a correct classification of the adversarial input, and thereby generate an updated training dataset; and
retrain the deep learning computer model based on the updated training dataset.

20. An apparatus comprising:
at least one processor; and
at least one memory coupled to the at least one processor, wherein the at least one memory comprises instructions which, when executed by the at least one processor, cause the at least one processor to implement an adversarial input detection and purification (AIDAP) preprocessor and a deep learning computer model, which operate to:
receive, by the deep learning computer model, input data for processing by the deep learning computer model;
process, by the deep learning computer model, the input data to generate a first pass output that is output to the AIDAP preprocessor;
determine, by the AIDAP preprocessor, a discriminative region of the input data based on the first pass output, wherein the discriminative region is a portion of the input data that is determined to have a significant influence on the operation of the deep learning computer model in generating the first pass output;
transform, by the AIDAP preprocessor, a subset of elements in the discriminative region of the input data to modify a characteristic of the elements in the subset of elements and generate a transformed input data;
process, by the deep learning computer model, the transformed input data to generate a second pass output that is output to the AIDAP preprocessor;
detect, by the AIDAP preprocessor, that the input data comprises an adversarial input or is a non-adversarial input based on a comparison of the first pass output with the second pass output; and
in response to the AIDAP preprocessor detecting the input data comprises an adversarial input, perform a responsive action that mitigates effects of the adversarial input.

* * * * *